C. FELL.
METHOD OF MANUFACTURING RIFLED PIPES.
APPLICATION FILED JUNE 25, 1909.
1,033,569.
Patented July 23, 1912.
3 SHEETS—SHEET 3.
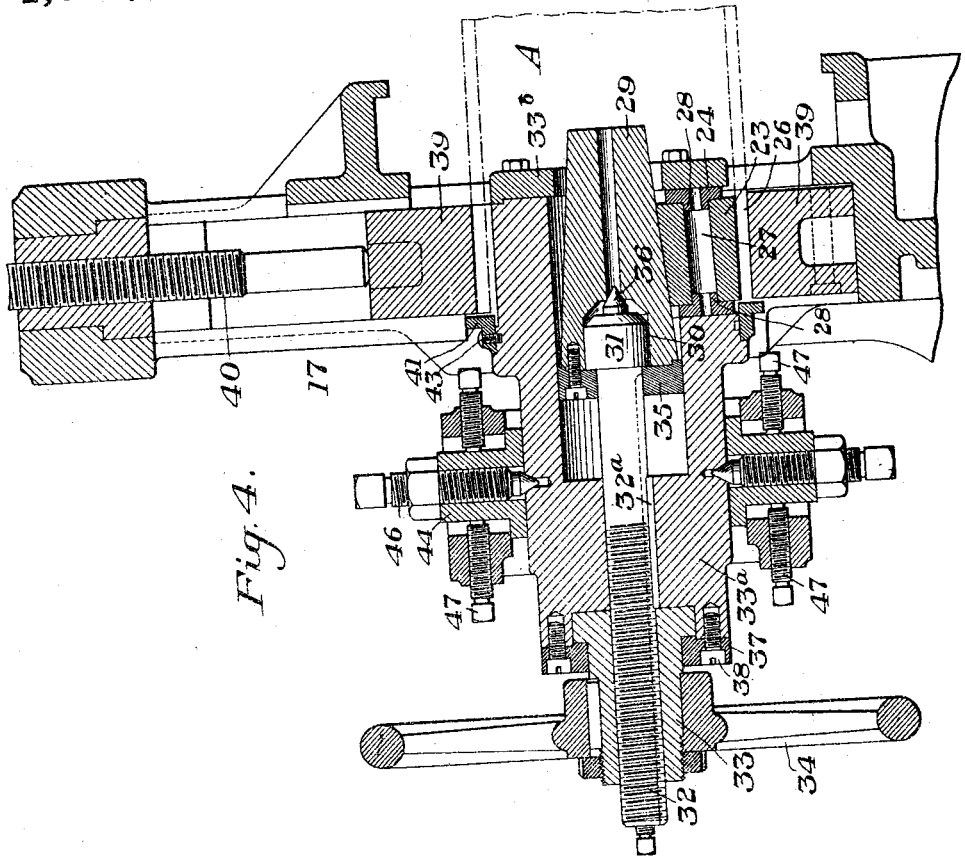
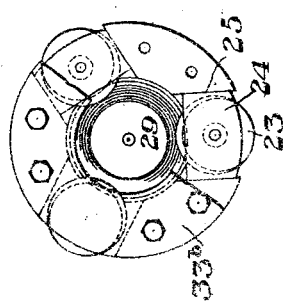
WITNESSES
INVENTOR
Charles Fell

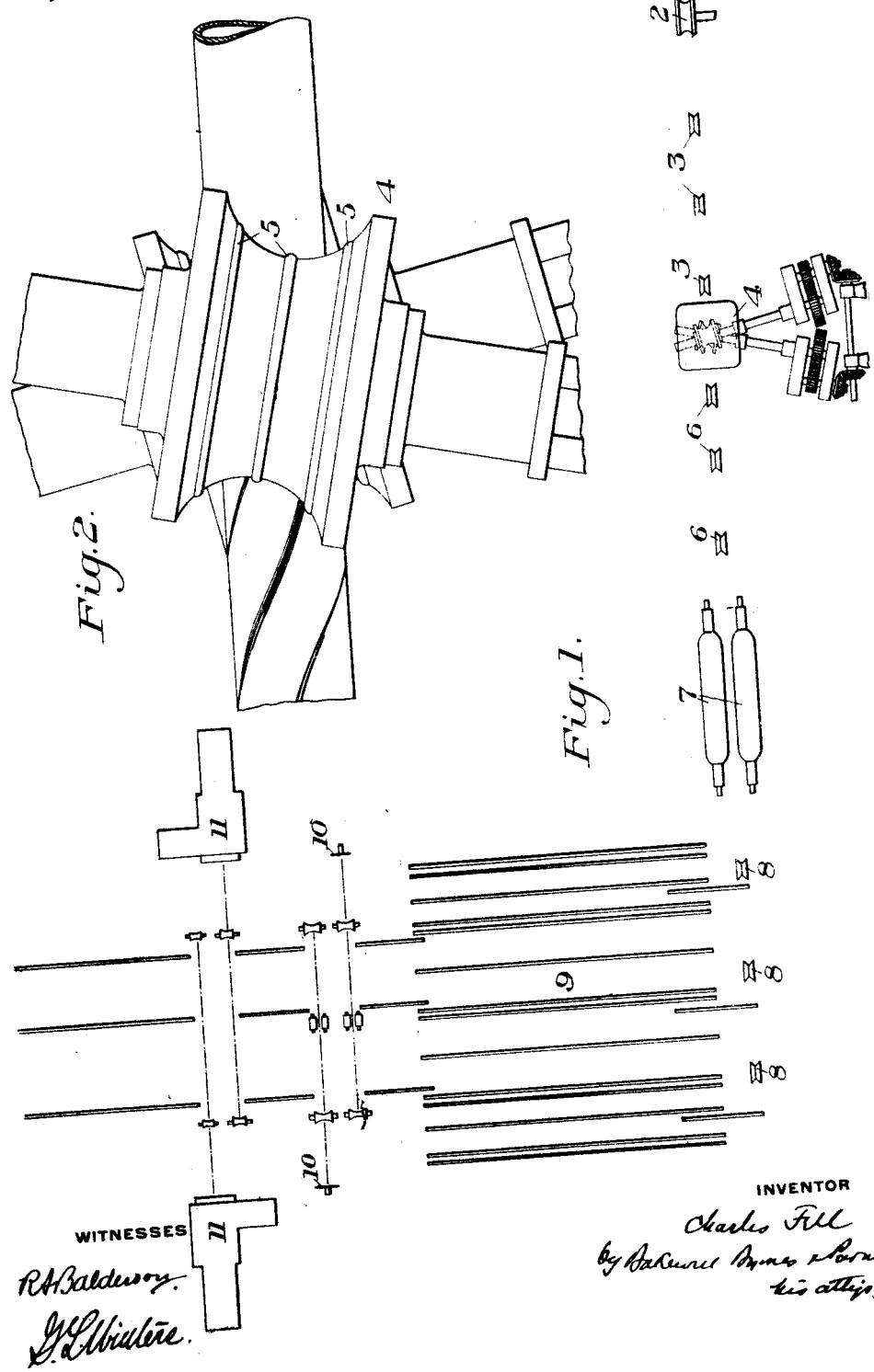

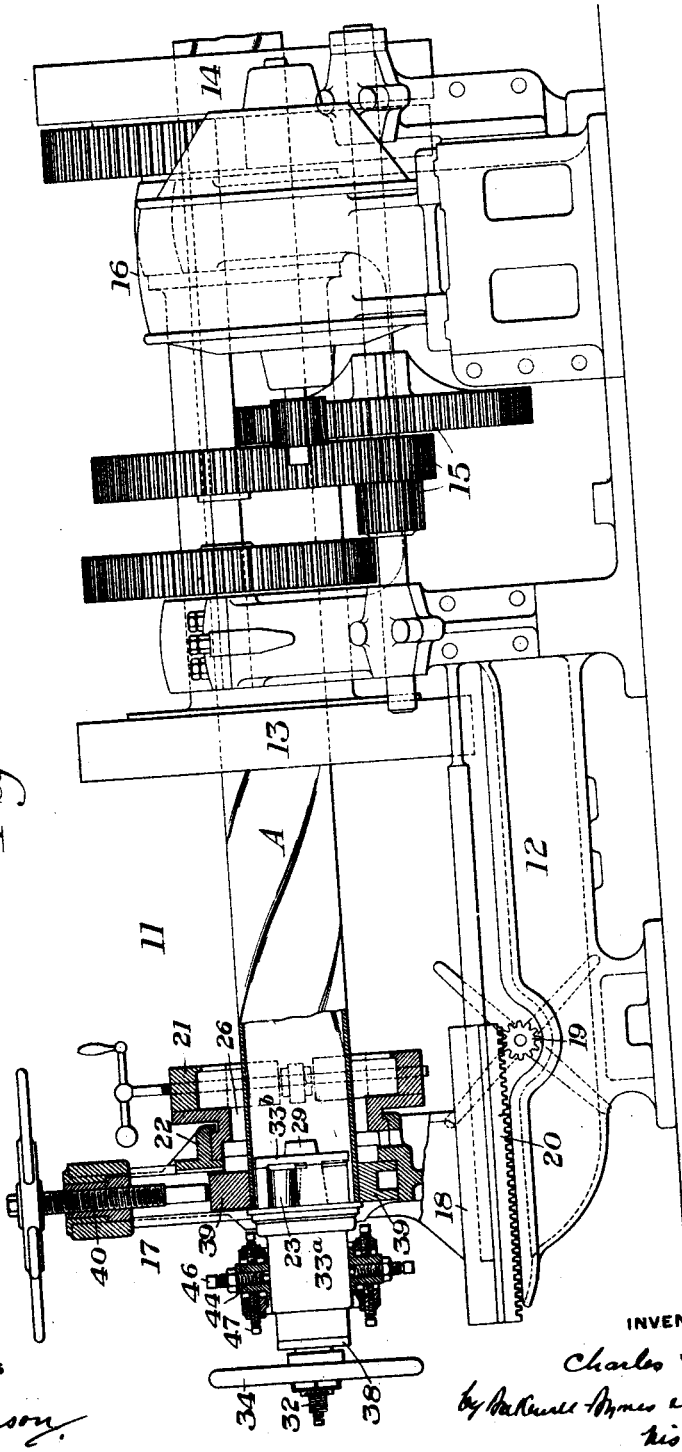

UNITED STATES PATENT OFFICE.

CHARLES FELL, OF LORAIN, OHIO, ASSIGNOR TO NATIONAL TUBE COMPANY, OF PITTSBURGH, PENNSYLVANIA, A CORPORATION OF NEW JERSEY.

METHOD OF MANUFACTURING RIFLED PIPES.

1,033,569.

Specification of Letters Patent. Patented July 23, 1912.

Application filed June 25, 1909. Serial No. 504,315.

*To all whom it may concern:*

Be it known that I, CHARLES FELL, of Lorain, Lorain county, Ohio, have invented a new and useful Improvement in Methods of Manufacturing Rifled Pipes, of which the following is a full, clear, and exact description, reference being had to the accompanying drawings, forming part of this specification, in which—
Figure 1 is a diagrammatic plan view of a plant arranged for carrying out my invention; Fig. 2 is a plan view on a larger scale, showing the rifling rolls; Fig. 3 is an elevation partly in section of the expanding and threading machine; Fig. 4 is a vertical sectional view of the expanding rolls and adjacent parts; and Fig. 5 is a detail view of the expanding rolls.

My invention relates to the making of rifled pipes or tubes, wherein the pipes or tubes are provided with rifling grooves.

The object of the invention is to provide a cheap, simple and rapid process by which the pipes may be rifled from end to end and then expanded at their ends to prepare them for the threading operation.

Prior to my invention, pipes or tubes had been rifled by feeding the tube, which already had its ends threaded and couplings applied thereto, into a rifling machine with the parts in inoperative position. The parts of the rifling machine were then closed on the tube at a point intermediate of its length and beyond the part to be threaded. The intermediate part of the pipe was then rifled, the rifling being stopped before reaching the other end to be threaded cold. Such process was slow and expensive and considerable loss resulted by reason of splitting the metal, owing to its being rifled while cold. My invention overcomes these difficulties and provides a much more rapid and cheap process, since the tube or pipe is rifled while hot, the rifling being carried out from end to end so that there is no delay in adjusting and readjusting the parts of the rifling machine. Being rifled while hot, the liability to splitting is greatly reduced, and therefore, the ends of the pipe are expanded for threading or other operations thereon.

In the drawings, referring to Fig. 1, 2 represents the sizing rolls, to which the hot tube or pipe is taken from the welding machine or welding rolls (not shown). From the sizing rolls, the metal is carried over suitable feed devices, such as rolls 3, to the rifling machine 4. This rifling machine is provided with skew rolls having beads 5 thereon, as shown in Fig. 2. This rifling machine is disclosed and claimed in my United States Letters Patent, No. 888,984, dated May 26, 1908, for "apparatus for rifling pipes or tubes".

As the front end of the hot pipe enters the skew rifling rolls, it begins to rotate and the rolls apply thereto the rifling grooves, as indicated in Fig. 2. After the tube has thus been rifled from end to end, it passes over suitable feed mechanism, such as rolls 6, to the cross rolls, indicated at 7. These cross rolls straighten the tube, and are preferably skewed relatively to each other in order to effectively carry out the straightening operation. From the cross rolls, the tube passes on to further feed devices, shown as rolls 8, 8, from which it is taken to the cooling bed 9. From the cooling bed, the rifled pipes pass to shears or saws 10, 10. These saws are shown as staggered relatively to each other and as acting successively so that the pipe may be cut any desired length. From the saws or cutters 10, the pipe then passes to the expanding and threading machines, shown at 11, which also act successively.

Each expanding and threading machine is preferably constructed and arranged as shown in Figs. 3 and 4, though these operations may be carried out in any desirable manner. In the form shown, 12 designates the bed of an ordinary pipe-threading machine. 13 and 14 are the usual holding chucks, which are rotated by the train of gears 15, driven by the motor 16. 17 designates the threading head, which is mounted on the longitudinally movable carriage 18, actuated by the pinion 19, which engages the teeth of the rack 20. 21 is the usual chuck or head in which the threading tools are carried, and which is mounted on the slide 22. These parts are all similar to those used on existing pipe-threading machines and need not be described in detail.

The expanding attachment consists of a series (three being shown in the present instance) of rollers 23. These rollers are of tapered or frusto-conical form and are journaled between and upon plates or washers 24, which are arranged to slide in radial guides 25, in the support hereinafter described, around the opening 26 through which the pipes to be expanded pass. The rollers are shown as having openings 27 bored therethrough, into the end portion of which are loosely fitted bosses 28 on the plates or washers 24. The outer faces of these plates or washers are faced or planed at an angle of ninety degrees to the longitudinal axis of the machine, as shown, while the inner faces of the plates, which bear against the ends of the rollers, are substantially parallel to the axis of the pipe to be expanded; whereby the axes of such rollers are brought at an angle to the axis of the pipe to be expanded, while the tapered surfaces of said rollers at the outer sides thereof are parallel with such axis.

29 is a frusto-conical wedge or expander, which is tapered to the same angle as the rollers 23, but in the reverse direction, so that as it is moved forwardly, between the rollers, the latter will be moved away from the center. This wedge or expander is counterbored at its large end, as shown at 30, to receive the head 31 of the actuating screw 32, which has a threaded bearing in a nut 33, seated in the supporting block 33ᵃ. This screw is actuated by a hand wheel 34. The head of the screw 31 is secured in the counterbore 30 of the wedge or expander by a retaining plate 35, which is secured to and rotates with the expander. The head 31 has a pointed or conical center 36, which has a bearing within the expander for the purpose of reducing the friction. The nut 33 is set into a counterbore in the body 33ᵃ and is held by the retaining plate 37, secured by screws 38, or other suitable means. When the hand wheel 34 is actuated the screw 32 which is held from turning by a spline or feather 32ᵃ will be moved forward to thereby force forward the wedge or expander 29, to cause the rollers 23 to move out or away from the center line of the head.

The pipe or tube A, whose end is to be expanded is secured in the chuck 13, or in both the chucks 13 and 14, if it is of sufficient length, with its free end passing through the threading chuck 21 and between the rollers 23 and the rounding up jaws or blocks 39, the latter being seated in the head 17, and the upper of said blocks having a holding down screw 40. As the pipe or tube is rotated while the tapered rollers 23 are being moved forwardly by the action of the screw 32, the outer faces of said rollers will expand the said pipe or tube in a direction parallel with its axis. The contact between these rollers and the inner surface of the pipe or tube will cause the rollers to rotate and these, in turn, rotate the wedge or expander 29. A roller bearing effect is thus produced which extends very greatly the life of the tool.

33ᵇ is a cap which is fastened to the body 33ᵃ and which forms the end bearing or slide for the rear plates or washers 24.

41 designates a cap which is rotatably secured to the body 33ᵃ by a stud or screw 43, whose end runs in a circular groove in said body. This collar acts as a gage for the expanding head as the latter enters the pipes or tubes, and as it extends beyond the face of the slots in said body, in which the front washers 24 are seated, it also acts as a guard to prevent said washers and the rollers from falling out of place. The body 33ᵃ is held in the frame 44 by the pivoting screws 46. The expanding head can be adjusted back and forth by means of the screws 47, which bite against the nuts 49 of the pivoting screws 45.

The rounding up blocks or dies 39 are so shaped as to fit closely to the outside diameter of the pipe, so that the rollers 23 can not expand the pipe beyond its proper size. The ends of the rifling pipe are thus successively expanded and threaded, these operations being carried out while the metal is cold.

The advantages of my invention will be readily apparent to those skilled in the art. Not only are the operations carried out more rapidly and cheaply, but a better product is obtained, especially where the pipe is rifled while hot. With the old method, the pipe must be cut to length before it is rifled, and as previously carried out, it was not only cut to length, but also the ends were threaded before the two were subjected to the rifling operation. In such case, the rifling can not be carried closely up to the threaded portion, as in my process.

The pipe or tube may be straightened either before or after the rifling operation, though I prefer to straighten it afterward, since otherwise, the pipe would be straightened while cold after the rifling operation, which tends to bend it somewhat.

Different machines or apparatus may be employed for rifling and for carrying out the other steps without departing from my invention.

I claim:

1. The method of making pipes and tubes consisting in taking a welded pipe or tube and while still heated from the welding operation, successively sizing, rifling, straightening and then cutting the pipe or tube to length and finally expanding the ends of the cut pipe to remove the rifling grooves therein and then threading the so restored cylindrical end portions of the rifled pipes or tubes.

2. The method of making pipes and tubes consisting in taking a welded pipe or tube and while still heated from the welding operation, successively rifling, straightening and then cutting the pipe or tube to length and finally expanding the ends of the cut pipe to remove the rifling grooves therein and then threading the so restored cylindrical end portions of the rifled pipes or tubes.

3. The method of making pipes and tubes consisting in taking a welded pipe or tube and while still heated from the welding operation, successively sizing, rifling and then cutting the pipe or tube to length, then expanding the ends of the cut pipe to remove the rifling grooves therein, allowing the expanded pipe to cool and then threading the so restored cylindrical end portions of the rifled pipes or tubes.

4. The method of making pipes and tubes consisting in taking a welded pipe or tube and while still heated from the welding operation, successively rifling and then cutting the pipe or tube to length and finally expanding the ends of the cut pipe to remove the rifling grooves therein, allowing the pipe to cool and then threading the so restored cylindrical end portions of the rifled pipes or tubes.

In testimony whereof, I have hereunto set my hand.

CHARLES FELL.

Witnesses:
A. F. TIBBETTS,
H. M. CORWIN